(12) United States Patent
Zeik

(10) Patent No.: US 7,527,840 B2
(45) Date of Patent: May 5, 2009

(54) FLEXIBLE LAMINATE HAVING AN INTEGRATED PRESSURE RELEASE VALVE

(75) Inventor: Douglas Bruce Zeik, Liberty Township, OH (US)

(73) Assignee: The Folgers Coffee Company, Cincinnati, OH (US)

( * ) Notice: Subject to any disclaimer, the term of this patent is extended or adjusted under 35 U.S.C. 154(b) by 0 days.

(21) Appl. No.: 11/291,421

(22) Filed: Dec. 1, 2005

(65) Prior Publication Data

US 2006/0083877 A1    Apr. 20, 2006

Related U.S. Application Data

(63) Continuation-in-part of application No. 11/145,649, filed on Jun. 6, 2005, now abandoned.

(60) Provisional application No. 60/583,237, filed on Jun. 25, 2004.

(51) Int. Cl.
*B32B 27/00*    (2006.01)
*B32B 3/20*    (2006.01)

(52) U.S. Cl. .................... 428/35.2; 428/34.1; 428/34.4; 428/34.6; 428/34.7; 428/35.3; 428/35.4; 428/35.7; 428/35.8; 428/35.9; 428/36.4; 428/36.6; 428/188; 428/321.1; 428/411.1; 428/412; 428/446; 428/447; 428/457; 428/474.4; 428/480; 428/500; 428/523; 428/688; 428/689

(58) Field of Classification Search ................ 428/34.1, 428/34.4, 34.6, 34.7, 35.2, 35.3, 35.4, 35.7, 428/35.8, 35.9, 36.4, 36.6, 36.7, 36.9, 98, 428/131, 137, 188, 221, 320.2, 321.1, 323, 428/325, 327, 331, 357, 402, 411.1, 412, 428/446, 447, 457, 474.4, 480, 500, 523, 428/688, 689
See application file for complete search history.

(56) References Cited

U.S. PATENT DOCUMENTS

| | | | | | |
|---|---|---|---|---|---|
| 5,263,777 | A | * | 11/1993 | Domke | 383/103 |
| 5,826,723 | A | * | 10/1998 | Jaszai | 206/522 |
| 5,912,058 | A | * | 6/1999 | Takahashi et al. | 428/34.3 |
| 6,165,571 | A | | 12/2000 | Lykke | |
| 6,632,363 | B1 | * | 10/2003 | Grech et al. | 210/610 |

FOREIGN PATENT DOCUMENTS

EP    0144011 B2    12/1992

* cited by examiner

*Primary Examiner*—Rena L Dye
*Assistant Examiner*—Walter B Aughenbaugh
(74) *Attorney, Agent, or Firm*—Calfee, Halter & Griswold LLP

(57) ABSTRACT

A multilayered flexible laminate is disclosed that includes a first lamina having a inlet channel; a second lamina having a outlet channel; the first and second laminas joined to one another about an unbonded valve region having open and closed orientations; wherein the inlet channel and the outlet channels are in gaseous communication when the valve region is in the open orientation.

17 Claims, 3 Drawing Sheets

FLEXIBLE LAMINATE HAVING AN INTEGRATED PRESSURE RELEASE VALVE

CROSS REFERENCE TO RELATED APPLICATIONS

This application is a Continuation-in-Part of application Ser. No. 11/145,649, filed Jun. 6, 2005, now abandoned, which claims the benefit of priority to U.S. Provisional Application Ser. No. 60/583,237, filed Jun. 25, 2004, which is herein incorporated by reference.

FIELD OF THE INVENTION

The present invention relates to flexible laminates having an integrated, one-way pressure release valve which may be used in conjunction with a sealed container for packing products under vacuum. The invention relates generally to a one-way valve that provides relief of a pressure differential between the interior and exterior of a sealed container while concurrently preventing the entry of external air back through the valve.

BACKGROUND OF THE INVENTION

In today's marketplace, many products are packaged in sealed containers using vacuum packing. Often, this is done because the product is oxygen-sensitive and will degrade upon exposure to oxygen. Common examples of oxygen-sensitive products that use a vacuum packed container include coffee and dairy products.

Vacuum packing works by reducing the gas present in the headspace of a container. In this way vacuum packing lessens the exposure of the product to oxygen, and in turn, reduces the extent to which the product oxidizes and degrades before reaching the consumer. Vacuum packaging of products that generate off-gas, such as fresh coffee, also provides a means of sealing the final package before the product off-gassing has completed without generating high pressures in the finished package. The additional volume of gas generated by the product can increase the internal pressure of the package back to near ambient, but without the initial vacuum state, the sealed package may deform or burst due to high internal pressure. One problem with vacuum packaging of semi-rigid containers is the exposure of the structure to high stresses that require an overall stronger container to resist damage and deformation. Also for vacuum packaging of flexible packages, e.g. bags, enough internal package volume may not be available to adequately compensate for the off-gassing of the product without significant bulging of the package. A final problem with standard vacuum packing techniques used today is that pressure changes external to the container may damage the integrity of the vacuum seal, and therefore, allow oxidation of the product to occur. Such changes in pressure are known as pressure differentials.

A positive pressure differential, also called overpressure, exists when the pressure inside a sealed container is higher than the pressure of the external atmosphere. There are many factors that are known to cause overpressure. For example, the off-gas produced by a product sealed within a container may cause overpressure. Similarly, subjecting a sealed container to an increase in elevation may cause overpressure because as the altitude increases and the external pressure drops, the internal pressure of the container is effectively increased. Finally, subjecting a sealed container to an increase in temperature causes the gas volume inside the container to expand, thus increasing the internal pressure of the container relative to the external atmospheric pressure. Such overpressure may cause the seal of the container to fail, thereby exposing the product therein to oxygen. As explained above, oxidation may degrade the product and negatively effect the quality of the product before it reaches the consumer. Moreover, with enough overpressure the container may actually explode, which would result in a total loss of the product.

Conversely, a negative pressure differential, also called a vacuum, exists when the internal pressure of the container is less than the external pressure of the environment. There are many factors known to cause a vacuum. For example, the adsorption, absorption or reaction of gases generated by the product within the container may cause a reduction in the internal pressure of the container. Similarly, subjecting a sealed container to a decrease in elevation increases the external pressure in relation to the internal pressure of the container thereby causing a negative pressure differential. Finally, subjecting the sealed container to a decrease in temperature causes the gas volume within the container to contract, thus decreasing the internal pressure of the container in relation to the external pressure. Such a negative pressure may cause the vacuum to fail, thus oxidizing, and possibly degrading, the product. Moreover, if the vacuum is strong enough, it may cause the container to implode.

An alternative means to vacuum packing is through the use of a one way valve incorporated in the otherwise sealed package structure. The use of such a valve allows for off-gassing of a product, such as fresh ground coffee, in an otherwise sealed package without the need for an imposed vacuum to prevent excessive pressure within the package. By means of a venting valve, the deficiencies of vacuum packing of semi-rigid containers as well a flexible packaging can also be avoided.

Another advantage of packaging with a one-way valve is that overpressure issues can be avoided since the valve will vent away positive pressure differentials as described above during the life of the packaging. For example, it is known that sealed plastic containers with large headspace volumes have a tendency to fail when exposed to high altitudes, such as when the product is being transported across the Rocky Mountains in the United States with elevations as high as 11,000 feet above sea level. As aforementioned, this happens because high altitudes cause the pressure external to the container to drop. As a result, the internal pressure on the container is greater than the external atmospheric pressure. Without a way for the internal pressure to be released, the container can expand and bulge, eventually causing the seal to fail, resulting in exposure of the product to oxygen, which as aforementioned, may be damaging to the product if it is oxygen-sensitive. The use of a one-way pressure relief valve can eliminate this type of high altitude failure since the excess differential pressure will be vented from the package. One complication of this venting at high altitude is found when a package that has been equilibrated at high altitude is transported to a lower altitude and thus exposed to a higher external pressure. For a one-way valve that prevents the back flow of air into the package, the sealed package will have a lower internal pressure than the external atmospheric pressure. The valve must be able to withstand this internal vacuum without failure to prevent the ingress of oxygen that may potentially damage the contents.

Previous attempts to solve the problem of vacuum failure in one way valves have had limited success. For example, it is known to place a longitudinal channel along the width of a laminate to allow the off-gasses produced by the product within the container to escape. Such valves are described by Schultz in EP 0 144 011 B2. However, the disadvantage of this longitudinal channel is that air from the surrounding atmosphere can enter the container, thereby oxidizing and degrading the product. The unlaminated channel extending to a weld line, rim or edge of the container is extremely susceptible to air entering back through the valve structure due to the large stresses imparted by the imposed vacuum. Moreover, because the longitudinal channel extends the entire width of the laminate, there is an increased likelihood of vacuum failure due to the fact that the channel prevents proper sealing of the container.

Other attempts to provide valve structures suitable for use with a laminate include a liquid sealant in combination with an intermediate valve strip. Such valves are disclosed by Domke in U.S. Pat. No. 5,263,777. However, this approach requires the use of an additional intermediate layer of laminate, which increases the cost of manufacturing and raises the price of the final product.

Therefore, there is a need to provide cost efficient, flexible laminates having an integrated pressure release valve, which may be used in conjunction with a variety of containers for packing products under pressure.

SUMMARY OF THE INVENTION

In one aspect, the present invention relates to a pressure relief valve that opens in response to small positive pressure differentials generated between the interior and exterior of a sealed container. Additionally, the present invention relates to a pressure relief valve, which after releasing/venting the excess positive pressure differential, actively reseals to prevent the air external to the container from entering back through the valve. Furthermore, the present invention relates to providing resistance to reverse flow through the valve even at high negative pressure differentials (vacuum internal to the package) that are typical of shipping through large elevation changes. Finally, the present invention relates to a valve that is suitable for both rigid and non-rigid packaging.

Therefore, in one aspect, the present invention relates to a multilayered flexible laminate having an integrated pressure release valve comprising:
 a. a first lamina having at least one inlet channel;
 b. a second lamina having at least one outlet channel;
 c. the first and second laminas at least partially bonded to one another about an unbonded valve region having open and closed orientations and having a liquid film disposed therein; and
 d. particles mixed with the liquid film at a location proximate to the inlet channel
  wherein the inlet and outlet channels preferentially permit gaseous communication in one direction within the valve region when the valve region is in the open orientation.

In another aspect, the present invention relates to a multilayered flexible laminate having an integrated pressure release valve comprising:
 a. a first lamina having at lease one inlet channel, the inlet channel disposed proximate to a liquid film having particles disposed therein;
 b. a second lamina having at least one outlet channel, the outlet channel disposed proximate to the to liquid film; and
 c. the first and second laminas bonded to one another about an enclosed unbonded valve region having open and closed orientations;
  wherein the inlet and outlet channels are offset from one another to preferentially permit gaseous communication in one direction within the valve region when the valve region is in the open orientation.

In another aspect, the present invention relates to a container sealed with the present laminate.

In another aspect, the present invention relates to a process for making a laminate having an integrated pressure release valve, the process comprise the steps of:
 a. providing a first lamina having first and second sides, the first lamina having an inlet channel disposed therein, the inlet channel providing gaseous communication from the first side of the first lamina to the second side of the first lamina;
 b. applying a liquid film to the second side of the first lamina; and
 c. joining a second lamina having first and second sides to the first lamina, the second lamina having a outlet channel disposed therein, the outlet channel of the second lamina providing gaseous communication from the first side of the first lamina to the second side of the second lamina;
  wherein the inlet channel of the first lamina and the outlet channel of the second lamina are both in gaseous communication with the liquid film.

DETAILED DESCRIPTION OF THE INVENTION

A: Definitions

Figure 1:
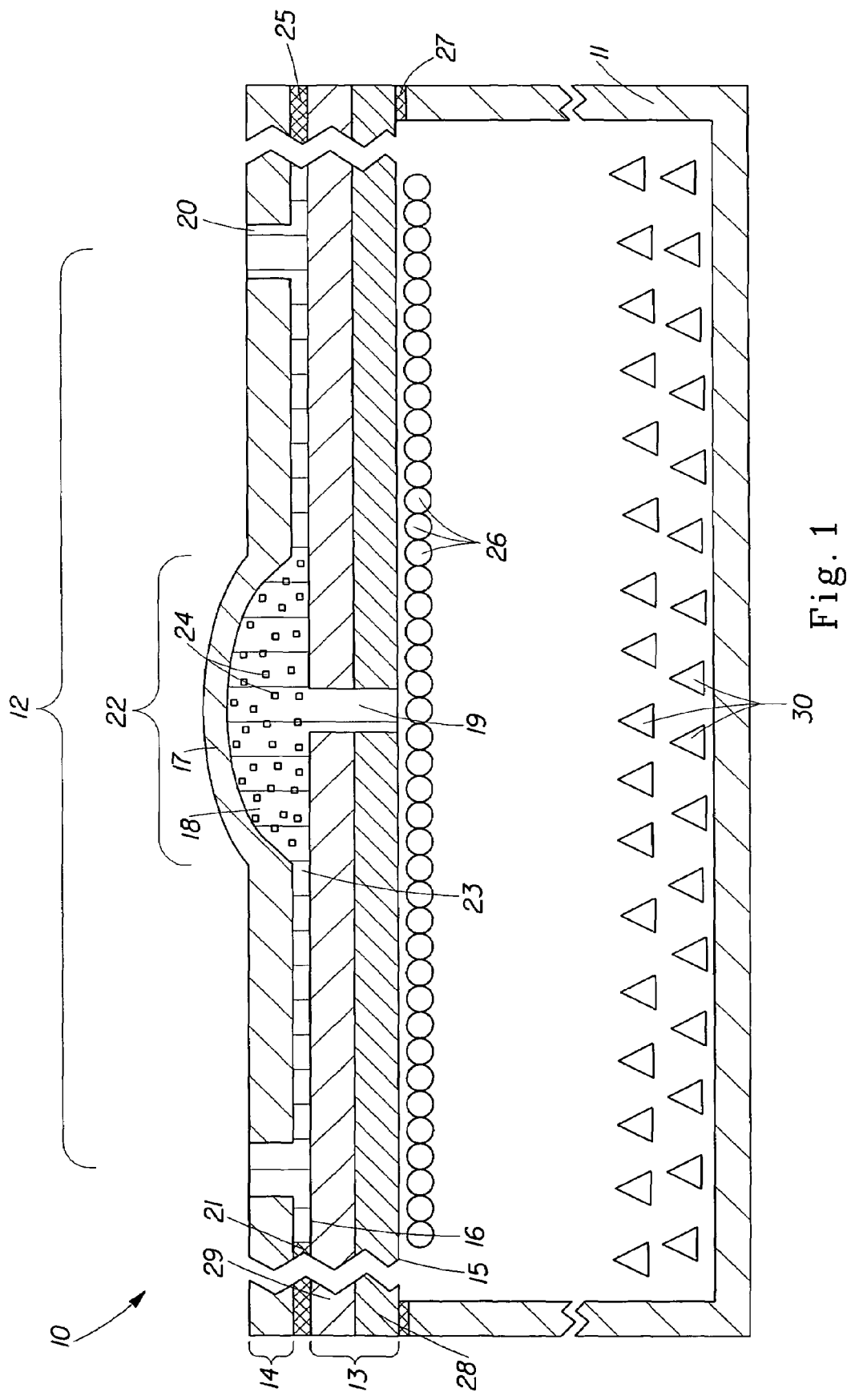
FIG. 1 is a schematic cross-sectional view of the closed configuration of an exemplary laminate having an integrated one-way valve in accordance with one embodiment of the present invention.

As used herein, the term "comprising" means various components can be cojointly employed in the methods and compositions of this invention. Accordingly, the terms "consisting essentially of" and "consisting of" are embodied in the term comprising.

As used herein, the term "container" means a canister, bottle, jar, bucket, carton, box, pouch, bag or any similar vessel, and may be made from plastic, cardboard, glass, foil or other like material. While the container may be made from a variety of materials, plastic and plastic-like materials are preferred for use herein.

As used herein, the term "gas" means any matter that is not a solid or a liquid and may include the air, the atmosphere or the product of off-gassing.

As used herein, the term "gaseous communication" means that a gas, or mixture of gases, may move freely about.

As used herein, the term "particles" means small, solid matter. The particles used herein may comprise powdered polymers, silica, carbon, carbon black and mixtures thereof. Preferably the particles comprise a powdered polymer selected from the group consisting of powdered nylon, polyester, silicone and combinations thereof. More preferably, the particles comprise powdered nylon.

B. Laminate Having Integrated Pressure Release Valve

The present invention is related to a flexible laminate having an integrated one-way pressure release valve. The laminate may be used in conjunction with a sealed container for holding gas-generating products, as well as for transporting such sealed containers through elevation and temperature changes. Moreover, the laminate used in conjunction with a variety of different containers and placed in a variety of different ways to achieve the desired effect, though it is preferably used in conjunction with containers made from plastics, composites and the like. Indeed, the present laminate may even be bonded to itself to form a pouch or bag. Regardless of how the laminate of the present invention is used, the structure of the integrated valve provides pressure release in a preferred direction.

Moreover, the present invention provides consumers with a low-cost, easy-open packing container that maintains the quality of the product.

In one embodiment of the present invention, a one-way pressure release valve may be integrated within a laminate, the valve functioning in one instance to release pressure built up within the container due to such factors as off-gassing of a product therein, increase in altitude and increase in temperature. Moreover, the pressure release valve of the present invention functions in another instance to prevent air from entering the container when the internal pressure of the container is less than the external pressure, which may result from the adsorption, absorption, or reaction of gasses generated by the product within the container, decreased temperature or decreased altitude. Thus, even though the internal pressure of the container may increase or decrease in relation to the external atmosphere, the present valve adapts accordingly, thereby preserving the integrity of the seal, the container and the product therein.

Referring to an exemplary embodiment illustrated in FIG. 1, a laminate 10, having the valve of the present invention in a closed orientation, comprises a first lamina 13 and a second lamina 14. First lamina has a first side 15 and a second side 16 and second lamina has a first side 17 and a second side 18. Both first lamina 13 and second lamina 14 provide strength and decrease gas, especially $O_2$, permeability to laminate 10, which as aforementioned, is important when dealing with oxygen-sensitive products. First lamina 13 and second lamina 14 may comprise at least one layer of an organic polymer selected from the group consisting of polyolefins, polyamides, polyesters, polycarbonates, and combinations thereof. While first lamina 13 is shown as having first layer 28 and second layer 29, it should be understood that both first lamina 13 and second lamina 14 may comprise any number of layers, such as, for example, three, four, or five. For instance, first lamina 13 may optionally comprise additional layers. A primer layer may be used to increase adhesion between layers of laminate 10. A gas impervious layer comprising ethylene vinyl alcohol (EVOH), polyvinyl alcohol (PVOH), polyvinylidene chloride (PVDC), and combinations thereof, may be added to decrease $O_2$ permeability of laminate 10, which is beneficial since the quality of many products deteriorates at oxidation. A metallization layer comprising deposited aluminum may be used for decreasing $O_2$ permeability and improving the aesthetic appearance of laminate 10. Additionally, a sealant layer comprising a polyolefin selected from the group consisting of a polyethylene, polypropylene, copolymers thereof, and mixtures thereof, may be added to strengthen the bond obtained between laminate 10 and a container 11 at seal 27. Moreover, a sealant layer may also be used to make laminate 10 easily peelable from container 11.

Similarly, second lamina 14 may optionally, comprise a transparent polymer layer having print applied to second side 18 thereof for communicating product information about a product 30 to the consumer, such as, for example, brand name or directions for use. If a print layer is used, it is preferably on second side 18 of second lamina 14, thus preserving the print against damage and obtaining a more aesthetically appealing print. These optional laminate layers are more fully described in U.S. Pat. No. 6,165,571 issued on Dec. 26, 2000 to Lykke. It should be understood that the aforementioned addition layers are but examples of the optional types of materials that may be used with the laminate herein. One skilled in the art would understand, without undue experimentation, that other types of materials may be used. While laminate 10 may comprise any number of layers, as discussed above, the overall thickness of the laminate should be from about 0.1 μm to about 100 μm, preferably from about 0.1 μm to about 50 μm, more preferably from about 0.1 μm to about 30 μm.

Figure 2:
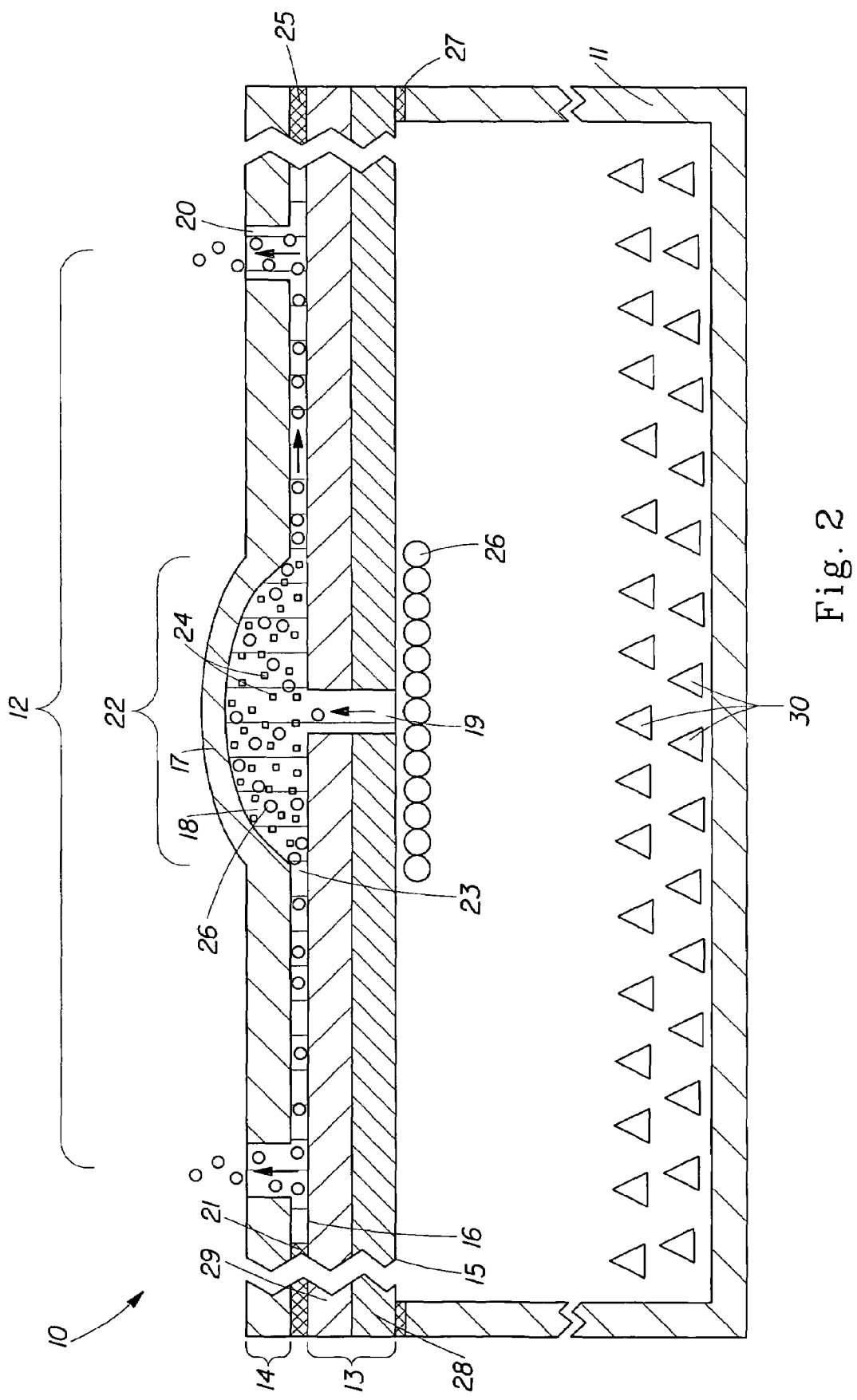
FIG. 2 is a schematic cross-sectional view of the open configuration of an exemplary laminate having an integrated one-way valve in accordance with one embodiment of the present invention.
Figure 3:
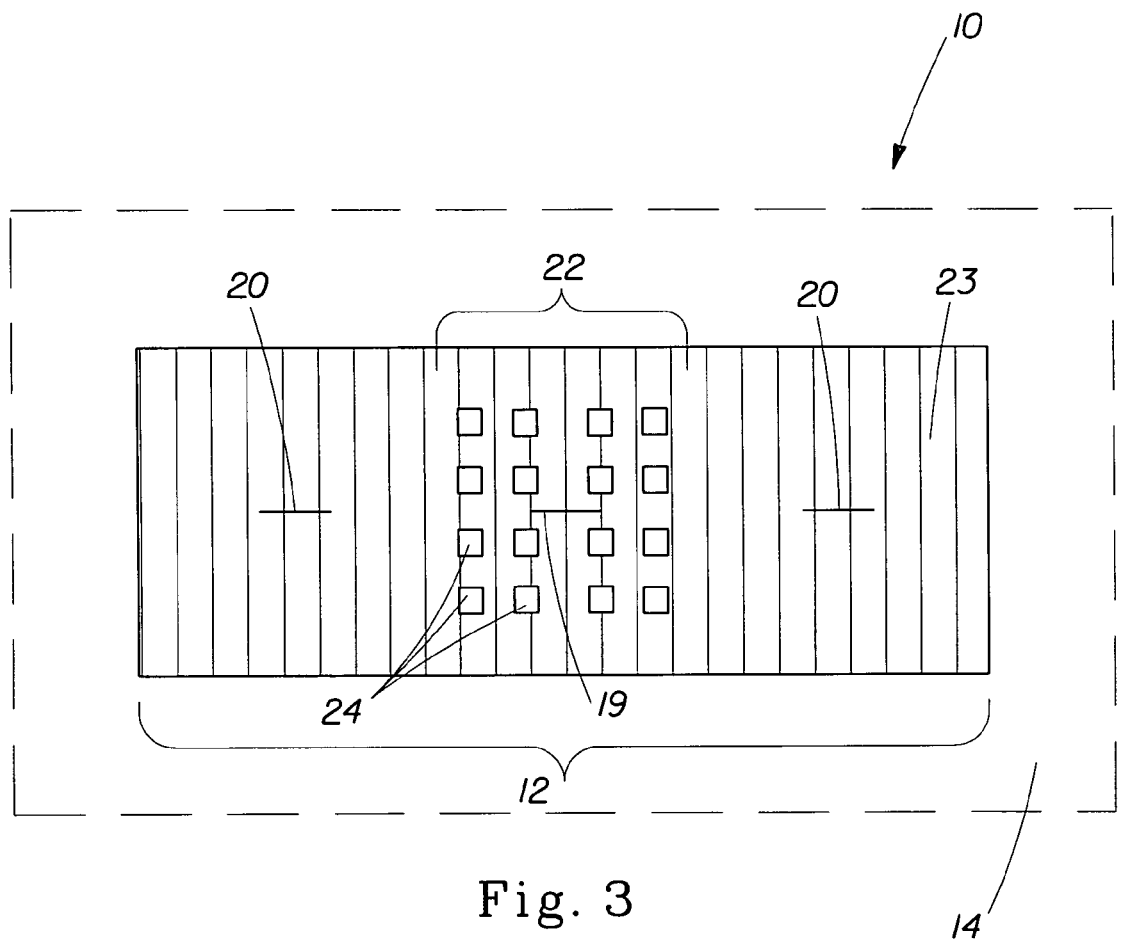
FIG. 3 is a schematic plan view of the top of an exemplary integrated one-way pressure release valve in accordance with the present invention.

Referring again to FIG. 1, first lamina 13 additionally has at least one inlet channel 19 that traverses, or passes through, first lamina 13. Similarly, second lamina 14 has at least one outlet channel 20 that traverses, or passes through, second lamina 14. Inlet channel 19 and outlet channel 20 allow gas to enter and exit the present valve as pressure changes occur, and may be in the form of slits, holes, perforations, and the like. Moreover, it is in response to these changes in pressure that the present valve opens and closes. Thus, gas 26 traverses through first lamina 13 at inlet channel 19 and through second lamina 14 at outlet channel 20. Additionally, positioning inlet channel 19 and outlet channel 20 so to be offset from one another allows the present valve to preferentially function in one direction, i.e. gases travel from the inside of a container to the outside of a container 11. This offset placement is shown in FIGS. 1, 2 and 3 and will be explained in greater detail below. A liquid film 23 may be disposed between first lamina 13 and second lamina 14 to prevent external air from entering valve region 12 through outlet channel 20. More specifically, a gas 26 can traverse from first side 15 of first lamina 13 through inlet channel 19 into liquid film 23 and then continue through outlet channel 20 to first side 17 of second lamina 14, but liquid film 23 prevents gas 26 from traversing from first side 17 of second lamina 14 through channel 20. Liquid film 23 can be any fluid and may comprise, for example, silicon oil, hydrocarbon oil, water or the like, variants of which would be known to those skilled in the art. It should be noted that liquid film 23 may be applied in excess because pressure applied during the lamination process removes a majority of the excess, though enough liquid film remains to maintain the functionality of the present valve.

Returning to FIG. 1, first lamina 13 and second lamina 14 can be joined to one another at a valve rim 21 which may completely enclose and define an unbonded valve region 12. It should be understood that valve region 12 may be situated in various and/or multiple locations throughout laminate 10 and valve rim 11 may define any number of shapes, such as, but not limited to, a circle, square, rectangle or other similar enclosed design. Furthermore, an adhesive 25 may be used to bond first lamina 13 and second lamina 14 to one another at valve rim 21. While any suitable adhesives or methods of adhesion may be used to bond first lamina 13 and second lamina 14 at valve rim 21, preferred for use herein includes, but is not limited to, pressure-sensitive adhesives, such as polyurethanes, and ultrasonic and heat welding applications.

As aforementioned, liquid film 23 may be disposed between first lamina 13 and second lamina 14 within valve region 12 to provide communication of gas 26 through inlet channel 19 and outlet channel 20. While liquid film 23 may be used independently to control gaseous communication through inlet channel 19 and outlet channel 20 within valve region 12, the addition of particles 24 to liquid film 23 at an interface region 22 is optional, but preferred. Specifically, particles 24 can be admixed with liquid film 23 in interface region 22 in a location proximate to inlet channel 19. Particles 24 may comprise powdered polymers, silica, carbon, carbon black and mixtures thereof, though other similar particles useful herein would be known to those skilled in the art. Preferably, the particles comprise a powdered polymer selected from the group consisting of powdered nylon, polyester, silicone and combinations thereof. More preferably, the particles comprise powdered nylon.

Referring now to FIG. 2 which shows valve region 12 in an open orientation, the addition of particles 24 to liquid film 23 at interface region 22, works in conjunction with the offset placement of inlet channel 19 and outlet channel 20 within valve region 12, to provide preferential release of gas 26 in a preferred direction, i.e. out of a container. Likewise, the valve of the present invention can be inverted and sealed to a container to allow gas into the container. Without intending to be bound by theory, particles 24 provide preferential release of gas 26 in a preferred direction through valve region 12 by reducing the adhesiveness of liquid film 23 at interface region 22 such that pressurized gas 26 traversing through inlet channel 19 may be in gaseous communication through valve region 12, but not through outlet channel 20 in a similar manner. Particles 24, having a definite size, serve to deflect the first and/or second lamina above inlet channel 19.

As shown in FIG. 3, inlet channel 19 and outlet channels 20 are offset from one another within valve region 12 such that inlet channel 19 is in direct contact with liquid film 23 having admixed particles 24 at interface region 22 while outlet channel 20 is in direct contact with liquid film 23 only.

Returning to FIG. 1 and FIG. 2, by way of example and not limitation, gas 26 disposed proximate to first side 15 of first lamina 13 is communicable from first side 15 of first lamina 13, through inlet channel 19, through liquid film 23 having particles 24 admixed therewith at interface 22 through outlet channel 20 through first side 17 of second lamina 14 and out into the external atmosphere. Specifically, gas 26 traverses from first side 15 of first lamina 13 through inlet channel 19 to interface region 22 having particles 24 admixed with liquid film 23 disposed therein. Particles 24 in liquid film 23 reduce the adhesiveness of liquid film 23 at interface 22 thereby allowing second lamina 14 to distend perpendicularly to first lamina 13 (FIG. 2) within unbonded valve region 12 as gas 26 moves through liquid film 23 to outlet channel 20. This open orientation of valve region 12 is illustrated in FIG. 2 and generally occurs at an internal pressure of at least about 10 mBars, preferably at least about 15 mBars, more preferably at least about 20 mBars, and still more preferably at least about 30 mBars. It should be understood that first lamina 13 may also distend perpendicularly to second lamina 14, or first lamina 13 and second lamina 14 may distend perpendicularly to one another. Additionally, one skilled in the art would understand that the pressure needed to open valve region 12 is based on several factors, including, but not limited to, number of channels, size of channels, size of the valve in relation to the size of the container, viscosity of the liquid, off-gassing of the packed product, and the like.

Regardless of the manner in which it occurs, the distension of unbonded valve region 12 permits gas 26 to more easily traverse through liquid film 23 through outlet channel 20 to first side 17 of second lamina 14. Once gas 26 has traversed through valve region 12, the adhesiveness of liquid film 23 self-compresses first lamina 13 to second lamina 14, thereby halting gaseous communication within valve region 12 until gas 26 again builds and begins traversing through inlet channel 19 of first lamina 13 causing valve region 12 to open. Self-compression of valve region 12 by the adhesiveness of liquid film 23 generally occurs at a pressure of less than about 10 mBar, preferably less than about 8 mBar. Moreover, if any gas 26 attempts to enter valve region 12 through outlet channel 20, it is prevented from doing so because liquid film 23 disposed proximate to outlet channel 20 acts as an adhesive that effectively seals valve region 12 and prevents the distention of first lamina 13 and/or second lamina 14 necessary for gaseous communication within valve region 12 to occur. Thus, having inlet channel 19, which is in direct contact with interface region 22 having particles 24 admixed with liquid film 23, and outlet channel 20, which is in direct contact with liquid film only, placed so as to be offset from one another within valve region 12, effectively allows the present pressure release valve to function in a preferred direction.

C. Use of Laminate Having Integrated Pressure Release Valve

The laminate of the present invention may be used in a variety of ways to provide selective pressure release. For instance, the laminate may be used in conjunction with container 11 used to pack pressurized products, such as those generating off-gases, or those transported through changes in altitude or temperature. The container may be in the forms of a canister, bottle, jar, bucket, carton, box, pouch, bag or any similar vessel and may be made from plastic, cardboard, glass, foil or other like material. While the container may be made from a variety of materials, plastic and plastic-like materials are preferred for use herein. Such containers optionally, but preferably, have a rim or mouth on which to releaseably seal the laminate to the container. The rim or mouth of the container may be situated in various locations, such as the top or bottom of the container and the laminate may be bonded to container 11 at a seal 27 by way of gluing, heat sealing, or combinations thereof. Finally, the present laminate may be bonded to itself to form a bag or pouch having at least one pressure release valve integrated therein. Of course, it should be understood that the aforementioned represents only a few of the uses for the present laminate. It should be understood by one skilled in the art that numerous other uses exist for the laminate of the present invention. It should also be understood that the present valve functions as a one-way pressure release valve whether or not the laminate is sealed to a container.

D. Process for Making Laminate Having Integrated Pressure Release Valve

A process for making a laminate having an integrated pressure release valve comprises the following steps: providing a first lamina having first and second sides, the first lamina having a inlet channel disposed therein, the inlet channel providing gaseous communication from the first side of the first lamina to the second side of the first lamina; applying a liquid film to the second side of the first lamina; joining a second lamina having first and second sides to the first lamina, the second lamina having a outlet channel disposed therein, the outlet channel of the second lamina providing gaseous communication from the first side of the first lamina to the second side of the second lamina; wherein the inlet channel of the first lamina and the outlet channel of the second lamina are both in gaseous communication with the liquid film. A detailed description of the process is found in the Example below.

EXAMPLE

A first lamina, which will comprise the backside of the finished laminate, is manufactured in the following manner. A biaxially oriented polyester (PETP) film having a thickness of about 12 μm is first roll coated with a polyurethane based primer, and then subsequently roll coated with an EVOH coating in the form of an alcohol/water solution of an EVOH granulate. An amount of about 1.2 g/m$^2$ (dry weight) of EVOH is applied to the primed PETP film and dried in a hot air tunnel producing a resultant dry coating thickness of about 1 μm. The coated PETP material is then metallized by vacuum deposition of aluminum onto the EVOH surface. The metallization thickness is about 300 Å. A PE film having a thickness of about 85 μm is then laminated to this metallized surface by means of a two-component polyurethane based adhesive applied in a roll coating system.

A second lamina, which will comprise the topside of the finished laminate, is manufactured in the following manner. A biaxially oriented polyester (PETP) film having a thickness of about 12 μm is printed on its inwardly facing side by means of a nitrocellulose-based printing ink.

The first lamina and second lamina are then joined together, along with additional layers, as follows. The topside lamina (second lamina) is roll coated with a two-component polyurethane based adhesive so as to leave defined adhesive-free regions measuring about 15 mm×42 mm. The adhesive-free regions are in registration with the print of the second lamina and have a periodic repeat in the machine direction (cutoff). The amount of adhesive applied is about 2 g/m$^2$ (dry weight) and is dried in a hot air tunnel prior to the lamination. Outlet channels are formed in this second lamina by means of shaft mounted knives that penetrate the film in the adhesive-free regions with a periodic repeat in the machine direction (cutoff).

Inlet channels are formed in the backside lamina (first lamina) by means of shaft mounted knives that penetrated the structure with a periodic repeat in the machine direction (cutoff) that matches the cutoff of the printed second lamina. Silicone oil having a viscosity of about 1000 cps and which contains about 1% by weight of a powdered nylon in the form of a slurry is then printed over the inwardly facing channels on the backside laminate (first lamina) via a smooth roll coater with the same periodic repeat in the machine direction (cutoff). The area that is coated with the silicone oil slurry measures about 10 mm×12 mm.

Topside lamina and backside lamina are then brought into contact via a heated nip roll at the registration of the two laminas such that unbonded valve regions are formed by aligning the printed adhesive, both sets of channels, and the applied silicone oil slurry.

The result is a multilayered, flexible laminate having an integrated pressure release valve comprising a silicon oil slurry having selectively placed powdered nylon particles therein and two sets of channels, which preferentially permit gaseous communication in one direction.

All documents cited herein are, in relevant part, incorporated herein by reference; the citation of any document is not to be construed as an admission that it is prior art with respect to the present invention.

While particular embodiments of the present invention have been illustrated and described, it will be obvious to those skilled in the art that various changes and modifications may be made without departing from the spirit and scope of the invention. One skilled in the art will also be able to recognize that the scope of the invention also encompasses interchanging various features of the embodiments illustrated and described above. Accordingly, the appended claims are intended to cover all such modifications that are within the scope of the invention.

What is claimed is:

1. A multilayered flexible laminate having an integrated pressure release valve and for use with a container, comprising:
   a. a first lamina having at least one inlet channel that passes through the first lamina;
   b. a second lamina having at least one outlet channel that passes through the second lamina;
   c. the first and second laminas at least partially bonded to one another about an unbonded valve region having open and closed orientations and having a liquid film disposed therein; and
   d. particles mixed with the liquid film at a location proximate to the inlet channel wherein the inlet and outlet channels preferentially permit gaseous communication in one direction within the valve region when the valve region is in the open orientation;
   wherein the inlet channel is open to the inside of the container to permit one direction gaseous communication from the inside of the container into the valve region; and
   wherein the particles comprise a particle selected from the group consisting of powdered polymers, silica, carbon, carbon black, and mixtures thereof.

2. The laminate of claim 1 wherein a gas enters through the inlet channel, travels through the valve region and exits through the outlet channel.

3. The laminate of claim 1 wherein the valve region moves between open and closed orientation in response to a change in pressure.

4. The laminate of claim 1 wherein the first lamina comprises an organic polymer selected from the group consisting of polyolefins, polyamides, polyesters, polycarbonates, and combinations thereof.

5. The laminate of claim 1 further comprising at least two inlet channels.

6. The laminate of claim 1 further comprising at least two outlet channels.

7. The laminate of claim 1 wherein the liquid film comprises a fluid selected from the group consisting of water, oils and mixtures thereof.

8. The laminate of claim 1 wherein the second lamina comprises an organic polymer selected from the group consisting of polyolefins, polyamides, polyesters, polycarbonates, and combinations thereof.

9. A multilayered flexible laminate having an integrated pressure release valve and for use with a container comprising:
   a. a first lamina having at lease one inlet channel that passes through the first lamina, the inlet channel disposed proximate to a liquid film having particles disposed therein;
   b. a second lamina having at least one outlet channel that passes through the second lamina, the outlet channel disposed proximate to the liquid film; and
   c. the first and second laminas bonded to one another about an enclosed unbonded valve region having open and closed orientations;
   wherein the particles comprise a particle selected from the group consisting of powdered polymers, silica, carbon, carbon black, and mixtures thereof;

wherein the inlet and outlet channels are offset from one another to preferentially permit gaseous communication in one direction within the valve region when the valve region is in the open orientation; and wherein the inlet channel is open to the inside of the container to permit one direction gaseous communication from the inside of the container into the valve region.

10. The laminate of claim 9 wherein the first lamina further comprises a gas impervious layer disposed thereon.

11. The laminate of claim 9 wherein the first lamina further comprises a metallized layer deposited on the gas impervious layer.

12. The laminate of claim 9 further comprises a sealant layer disposed thereon.

13. The laminate of claim 9 wherein the laminate is bondable to a container.

14. The laminate of claim 9 wherein the particles comprise powdered polymers selected from the group consisting of nylon, polyester, silicone and combinations thereof.

15. The laminate of claim 9 wherein the liquid film comprises silicon oil.

16. The laminate of claim 14 wherein the particles comprise powdered Nylon.

17. A container sealed with the laminate of claim 1.

* * * * *

UNITED STATES PATENT AND TRADEMARK OFFICE
CERTIFICATE OF CORRECTION

PATENT NO. : 7,527,840 B2 Page 1 of 1
APPLICATION NO. : 11/291421
DATED : May 5, 2009
INVENTOR(S) : Douglas Bruce Zeik It is certified that error appears in the above-identified patent and that said Letters Patent is hereby corrected as shown below:

On the title page, Related U.S. Application Data should read as follows:

Item (63) Continuation of application No. 11/145,649, filed on Jun. 6, 2005, now abandoned.

Column 1, line 7, "Continuation-in-Part" should read --Continuation--.

Signed and Sealed this

Nineteenth Day of January, 2010

David J. Kappos
*Director of the United States Patent and Trademark Office*